(12) United States Patent
Birley et al.

(10) Patent No.: US 9,366,180 B2
(45) Date of Patent: Jun. 14, 2016

(54) METHOD FOR REMOVING CARBON DIOXIDE, AND ALSO GAS TURBINE INSTALLATION WITH CARBON DIOXIDE REMOVAL

(75) Inventors: Roland Birley, Bamberg (DE); Christian Brunhuber, Auerbach (DE); Hermann Kremer, Liederbach (DE); Gerhard Zimmermann, Höchstadt/Aisch (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 466 days.

(21) Appl. No.: 13/825,395

(22) PCT Filed: Sep. 27, 2011

(86) PCT No.: PCT/EP2011/066759
§ 371 (c)(1),
(2), (4) Date: Mar. 21, 2013

(87) PCT Pub. No.: WO2012/052262
PCT Pub. Date: Apr. 26, 2012

(65) Prior Publication Data
US 2013/0174566 A1  Jul. 11, 2013

(30) Foreign Application Priority Data
Sep. 28, 2010  (DE) .......................... 10 2010 041 536

(51) Int. Cl.
*F02C 3/20*  (2006.01)
*B01D 53/14*  (2006.01)
*B01D 53/34*  (2006.01)
*C10L 3/10*  (2006.01)

(52) U.S. Cl.
CPC .............. *F02C 3/20* (2013.01); *B01D 53/1475* (2013.01); *B01D 53/343* (2013.01); *C10L 3/104* (2013.01); *B01D 2252/20494* (2013.01); *B01D 2256/22* (2013.01); *Y02C 10/04* (2013.01); *Y02C 10/06* (2013.01); *Y02E 20/16* (2013.01); *Y02E 20/18* (2013.01)

(58) Field of Classification Search
None
See application file for complete search history.

(56) References Cited

U.S. PATENT DOCUMENTS

| 4,568,364 | A | * | 2/1986 | Galstaun | ................ B01D 53/14 95/176 |
|---|---|---|---|---|---|
| 6,957,539 | B2 | | 10/2005 | Lebas | |
| 7,635,408 | B2 | * | 12/2009 | Mak | ................... B01D 53/1406 208/208 R |

(Continued)

FOREIGN PATENT DOCUMENTS

| DE | 69513093 T2 | 2/2000 |
|---|---|---|
| DE | 60214710 T2 | 9/2007 |

(Continued)

*Primary Examiner* — Craig Kim

(57) ABSTRACT

A method for capturing carbon dioxide is provided. In a first absorption process, carbon dioxide is absorbed by contacting a supplied carbon dioxide-containing natural gas with a first substream of a solvent. In this process a carbon dioxide-depleted natural gas and carbon dioxide-enriched solvent are formed. Then in a combustion process, the carbon dioxide-depleted natural gas is burnt, with a carbon dioxide-containing exhaust gas being formed. Then, in a second absorption process, carbon dioxide is absorbed by contacting the carbon dioxide-containing exhaust gas with a second substream of the solvent. In this process an exhaust gas freed from carbon dioxide and carbon dioxide-enriched solvent are formed. Then, in a desorption process, the first substream and the second substream of the carbon dioxide-enriched solvent are combined and carbon dioxide is desorbed by supplying heating energy, with carbon dioxide-depleted solvent being formed.

7 Claims, 1 Drawing Sheet

(56) References Cited

U.S. PATENT DOCUMENTS

| | | | |
|---|---|---|---|
| 8,211,213 B2 * | 7/2012 | Lechnick | C01B 3/52 95/159 |
| 8,887,510 B2 * | 11/2014 | Christensen | B01D 53/1418 166/272.3 |
| 2007/0006565 A1 | 1/2007 | Borseth | |
| 2009/0156696 A1 * | 6/2009 | O'Rear | B01D 53/1418 518/702 |
| 2010/0111784 A1 * | 5/2010 | Mak | B01D 53/1406 422/600 |
| 2013/0247766 A1 * | 9/2013 | Oppenheim | B01D 53/1406 96/234 |

FOREIGN PATENT DOCUMENTS

| | | |
|---|---|---|
| EP | 1303345 A1 | 4/2003 |
| EP | 1391669 A2 | 2/2004 |
| EP | 1745844 A1 | 1/2007 |
| FR | 2951385 A1 | 4/2011 |
| RU | 2343962 C2 | 1/2009 |

\* cited by examiner

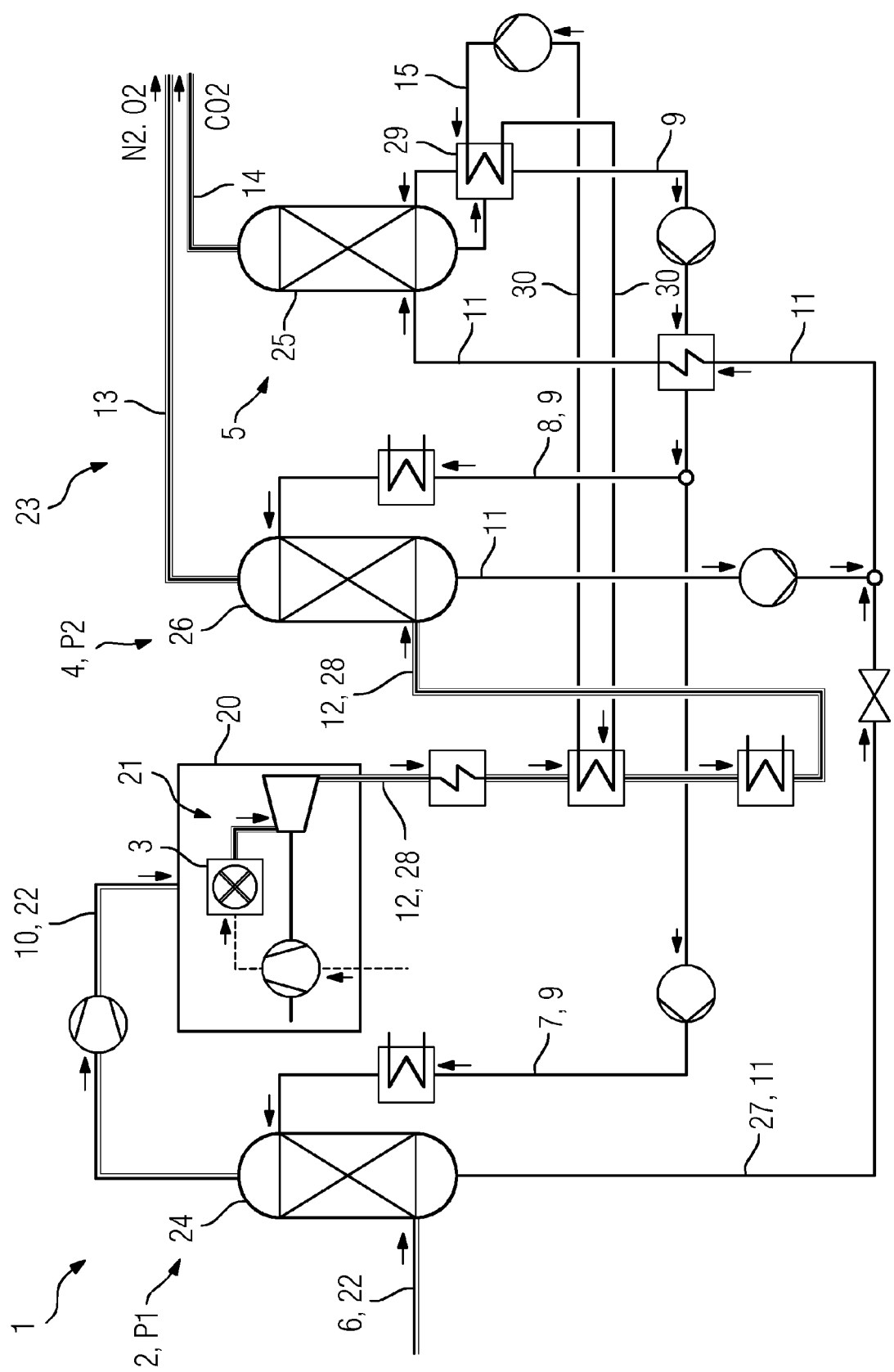

METHOD FOR REMOVING CARBON DIOXIDE, AND ALSO GAS TURBINE INSTALLATION WITH CARBON DIOXIDE REMOVAL

CROSS REFERENCE TO RELATED APPLICATIONS

This application is the US National Stage of International Application No. PCT/EP2011/066759, filed Sep. 27, 2011 and claims the benefit thereof. The International Application claims the benefits of German application No. 102010041536.7 DE filed Sep. 28, 2010. All of the applications are incorporated by reference herein in their entirety.

FIELD OF INVENTION

The invention relates to a method for capturing carbon dioxide with a first absorption process, a combustion process, a second absorption process and a desorption process. The invention further relates to a gas turbine plant with a gas turbine, which is connected on the fuel side to a fuel gas line, and the flue gas duct of which is connected to a downstream carbon dioxide capture device.

BACKGROUND OF INVENTION

The combustion of a fossil fuel in fossil fuel-fired power plants for generating electricity produces a carbon dioxide-containing flue gas. To prevent or reduce carbon dioxide emissions, carbon dioxide has to be separated from the flue gases. Various methods are generally known for separating carbon dioxide from a gas mixture.

In particular the absorption-desorption method is commonly used to separate carbon dioxide from a flue gas after a combustion process (Post-Combustion CO2 Capture, Post Cap). On a large industrial scale, in such a method carbon dioxide is scrubbed out of the flue gas with an absorbent at around atmospheric pressure. In a conventional absorption-desorption process the flue gas is brought into contact with a selective solvent as absorbent in an absorption column, the carbon dioxide being absorbed by the solvent. The solvent enriched with carbon dioxide is passed into a desorption column in order to separate the carbon dioxide and regenerate the solvent. The solvent is heated (possibly also depressurized), wherein carbon dioxide is desorbed again and a regenerated solvent is formed. The regenerated solvent is again passed to the absorber column, where it may again absorb carbon dioxide from the carbon dioxide-containing flue gas. Common absorbents display good selectivity and an elevated capacity for the carbon dioxide to be separated. Particularly suitable absorbents are those which are based on amines, such as for example monoethanolamine. In the chemical industry too, amine solutions are generally used as absorbents.

The Pre-Combustion CO2 Capture (Pre Cap) method, in which a CO shift and physical carbon dioxide scrubbing proceed under elevated pressure (IGCC concept), is commonly used to separate carbon dioxide prior to the combustion process.

When using standard natural gas as combustion fuel for a gas turbine, carbon dioxide is separated from the flue gas preferably after combustion in a standard gas turbine with premix combustion. Standard natural gas is in this case distinguished by a correspondingly high calorific value and a low proportion of inert gases (for example nitrogen or carbon dioxide).

On the other hand, in the case of a "lean" natural gas, which contains an elevated proportion of inert gases, such as for example natural gas with a high carbon dioxide content (e.g. 30 to 70% carbon dioxide content), said gas has first to be conditioned for combustion in a standard gas turbine.

To this end high grade natural gas may be admixed with the lean natural gas, for example, and thus enriched to a methane content which allows combustion in a standard gas turbine. It is also possible to allow combustion of a lean natural gas in a standard gas turbine by means of combustion with oxygen and subsequent condensation of water. However, these variants require high expenditure and additional gases.

It is alternatively possible to adapt the gas turbine specifically to low-calorific, lean natural gas. However, this may entail enormous development expenditure, depending on machine model.

SUMMARY OF INVENTION

It is therefore an object of the invention to provide a method and a device which on the one hand allows use of a lean natural gas with a standard gas turbine and on the other hand ensures capture of the carbon dioxide arising due to combustion.

The object of the invention is achieved with regard to the method by the features of the claims.

The invention is based on the idea of firstly subjecting a natural gas with a high carbon dioxide content to a carbon dioxide capture process prior to the combustion process. The carbon dioxide contained in the natural gas is in the process largely absorbed by a solvent as a result of a chemical absorption process. A carbon dioxide-depleted natural gas is thus available for the downstream combustion process. The carbon dioxide arising through the combustion of the natural gas is absorbed in a downstream capture process. The capture process here consists of an absorber, in which the flue gas is scrubbed by a solvent, and a desorber. According to the invention, carbon dioxide-enriched solvent from the absorption process upstream of combustion and that downstream of combustion is then together supplied to the desorber.

The invention thus consists on the one hand in combining an absorber process upstream of the combustion process particularly advantageously with an absorber process downstream of the combustion process. The staged absorption process, which may proceed at different pressures, is additionally particularly advantageously interconnected, such that only one solvent and only one desorption process have to be installed for both absorber processes. The absorption process upstream of the combustion process may also be markedly more compact due to the elevated pressure level.

The invention thus makes it possible to use a standard gas turbine with premix combustion systems even in the presence of a fuel gas or natural gas with a high carbon dioxide content. In this way lower NOx emissions may be achieved. In combination with capture from the flue gas, a significant reduction in overall emissions may be anticipated. Overall, the invention allows fuel gases or natural gases with a very high carbon dioxide content to be used, with an overall high level of carbon dioxide capture. In this way the capital and operating costs of a corresponding plant may be reduced markedly in comparison with the prior art.

In an advantageous development of the invention the first absorption process upstream of the combustion process is operated at a higher pressure than the second absorption process downstream of the combustion process. In this way the first absorption process may be operated at the delivery pressure of the fuel gas or natural gas, for example as it arrives at the plant after extraction from the gas field. Such gas pressures are preferably between 20 and 30 bar. If the fuel gas or natural gas is at a correspondingly low pressure level, the first absorption process may also be carried out in the low pressure range (at around atmospheric pressure). The fuel gas depleted by the first absorption process must in this case then be compressed to the pressure necessary for the combustion process due to the relatively low mass flow rate. The second absorption process and the desorption process are preferably operated at around atmospheric pressure.

In an advantageous further development of the method according to the invention, the heat needed for the desorption process is provided by the combustion process. To this end heat is removed from the flue gas duct via a heat exchange process and supplied to the desorption process. In this way, the desorption process may sensibly be operated by (surplus) energy available in the plant.

The solvent which leaves the desorption process again in a regenerated state is conveniently subdivided into a first sub-stream, which is supplied to the first absorption process, and a second sub-stream, which is supplied to the second absorption process.

The method is preferably used in a gas turbine power plant or a gas and steam turbine power plant. In this case, the power plant comprises a gas turbine, a carbon dioxide capture device arranged downstream of the gas turbine and a first absorber arranged upstream of the gas turbine.

The solvent used for absorbing carbon dioxide is preferably an aqueous amino acid salt solution. Other solvents are, however, feasible in principle.

The object of the invention relating to a device is achieved by the features of the claims.

BRIEF DESCRIPTION OF THE DRAWINGS

The invention will be explained in greater detail below with reference to an exemplary embodiment of the method according to the invention.

DETAILED DESCRIPTION OF INVENTION

FIG. 1 shows a method 1 for carbon dioxide capture, and substantially comprises a first absorption process 2, a combustion process 3, a second absorption process 4 and a desorption process 5. The first absorption process 2 comprises a first absorber 24 to which a natural gas 6 with a high carbon dioxide content is supplied via a fuel gas line 22. A solvent 9 is additionally supplied to the first absorber 24 via a first sub-stream 7. The carbon dioxide from the natural gas 6 is absorbed under pressure by the solvent 9, such that on the one hand a carbon dioxide-depleted natural gas 10 leaves the first absorption process under high pressure via the fuel gas line 22, and on the other hand a carbon dioxide-enriched solvent 11 is discharged.

The carbon dioxide-depleted natural gas 10 is then supplied to the combustion process 3, which is a component part of a gas turbine plant 20 and comprises a gas turbine 21. Combustion of the carbon dioxide-depleted natural gas 10 results in a carbon dioxide-containing flue gas 12, 1 which is supplied via a flue gas duct 28 to the second desorption process 4. A stream on the other hand a carbon dioxide-enriched solvent 11 is discharged.

The carbon dioxide-depleted natural gas 10 is then supplied to the combustion process 3, which is a component part of a gas turbine plant 20 and comprises a gas turbine 21. Combustion of the carbon dioxide-depleted natural gas 10 results in a carbon dioxide-containing flue gas 12, which is supplied via a flue gas duct 28 to the second absorption process 4. A steam generation process may be connected into the flue gas duct 28, which process generates steam for a steam turbine.

The second absorption process 4 comprises a second absorber 26, into which the carbon dioxide-containing flue gas 12 is fed together with a solvent 9, via a second sub-stream 8. The carbon dioxide from the carbon dioxide-containing flue gas 12 is absorbed by the solvent 9 substantially under atmospheric pressure, such that on the one hand a flue gas 13 largely purified of carbon dioxide and on the other hand a carbon dioxide-enriched solvent 11 are discharged from the second absorption process 4.

The carbon dioxide-enriched solvent 11 from the first absorption process 2 and the second absorption process 4 is supplied together to the desorption process 5. The desorption process comprises a desorber 25, in which the carbon dioxide-enriched solvent is decocted, carbon dioxide being desorbed. A separated carbon dioxide 14 and a solvent 9 are discharged from the desorption process, the solvent being regenerated.

The thermal energy 15 for heating the desorber 25 is removed from the hot carbon dioxide-containing flue gas 12 via a line 30. To this end the thermal energy is supplied to the desorber by heat exchange via a reboiler 29.

The second absorption process 4 arranged downstream of the combustion process 3 and the desorption process 5 here by themselves form a carbon dioxide capture device, as known as a Post-Combustion CO2 Capture Process.

The invention claimed is:

1. A method for capturing carbon dioxide, comprising:
   absorbing carbon dioxide in a first absorption process by bringing a supplied carbon dioxide-containing natural gas into contact with a first sub-stream of a solvent, a carbon dioxide-depleted natural gas and a first carbon dioxide-enriched solvent being formed;
   combusting the carbon dioxide-depleted natural gas in a combustion process of a gas turbine a carbon dioxide-containing flue gas being formed; and
   bringing the carbon dioxide-containing flue gas into contact with a second sub-stream of the solvent in a second absorption process, a flue gas purified of carbon dioxide and a second carbon dioxide-enriched solvent being formed;
   bringing together the first and the second carbon dioxide-enriched solvent in a desorption process and carbon dioxide is desorbed through the input of thermal energy, a carbon dioxide-depleted solvent being formed,
   wherein the first absorption process is carried out at a first pressure, and the first pressure corresponding to the pressure of the supplied carbon dioxide-containing natural gas, and the first pressure set higher than a second pressure set in the second absorption process.

2. The method as claimed in claim 1, wherein the thermal energy for the desorption process is extracted from the carbon dioxide-containing flue gas.

3. The method as claimed in claim 1, wherein the method is used in a gas turbine power plant with a gas turbine including a downstream carbon dioxide capture device and a first absorber arranged upstream of the gas turbine.

4. A gas turbine plant, comprising:
   a gas turbine, which is connected on a fuel side to a fuel gas line, comprising a flue gas duct connected to a downstream carbon dioxide capture device, the carbon dioxide capture device comprising a second absorber and a desorber; and a first absorber connected to the fuel gas line and comprising an input for a first carbon dioxide-depleted solvent, the first absorber further connected to the desorber via an absorbent line to deliver a first carbon dioxide-enriched solvent thereto;

wherein the first absorber is a high pressure absorber, which is designed for the pressure of the fuel gas line;

wherein the second absorber is a low pressure absorber, which is designed for essentially atmospheric pressure;

wherein the second absorber is further connected to the desorber to deliver a second carbon dioxide-enriched solvent thereto;

wherein the second absorber comprises an input for a second carbon dioxide-depleted solvent;

wherein the desorber is configured to remove an amount of carbon dioxide from the first and second carbon dioxide-enriched solvents, and wherein the desorber is connected to the input of the first and second absorbers and is configured to provide the first and second carbon dioxide-depleted solvent to the first and second absorbers, respectively.

5. The gas turbine plant as claimed in claim 4, wherein the desorber comprises a reboiler, and wherein a heat exchanger is connected into the flue gas duct, and wherein the heat exchanger is connected to the reboiler via a line, such that heat from the flue gas duct is transferred into the desorber.

6. The gas turbine plant as claimed in claim 4, wherein the fuel gas line is a natural gas line.

7. A gas and steam turbine plant, comprising:

a gas turbine plant as claimed in claim 4; a steam turbine driven by a boiler, wherein the boiler is arranged downstream of the gas turbine on a flue gas side.

\* \* \* \* \*